(12) United States Patent
Kissick et al.

(10) Patent No.: US 8,640,808 B2
(45) Date of Patent: Feb. 4, 2014

(54) MOTOR-DRIVEN CYCLE HAVING A FOOT-OPERATED THROTTLE CONTROL

(76) Inventors: Edwin Dennis Kissick, Rochelle, IL (US); Grant Spencer Manning, Rochelle, IL (US); Joseph David Hill, Rochelle, IL (US)

( * ) Notice: Subject to any disclaimer, the term of this patent is extended or adjusted under 35 U.S.C. 154(b) by 893 days.

(21) Appl. No.: 11/890,657

(22) Filed: Aug. 7, 2007

(65) Prior Publication Data

US 2009/0038870 A1 Feb. 12, 2009

(51) Int. Cl.
*B62K 11/00* (2013.01)
(52) U.S. Cl.
CPC ........................................ *B62K 11/00* (2013.01)
USPC ............................. 180/219; 180/315; 74/481
(58) Field of Classification Search
USPC ............ 180/219, 230, 292, 315, 335; 74/481, 74/482
See application file for complete search history.

(56) References Cited

U.S. PATENT DOCUMENTS

| | | | | |
|---|---|---|---|---|
| 1,642,376 | A * | 9/1927 | McDougall | 74/482 |
| 2,339,182 | A * | 1/1944 | McDonald | 180/205.4 |
| 3,856,123 | A * | 12/1974 | Kinsey | 192/3.62 |
| 3,985,040 | A * | 10/1976 | Hale | 74/482 |
| 4,056,268 | A | 11/1977 | Connor | |
| 4,181,190 | A * | 1/1980 | Yang | 180/219 |
| 4,283,965 | A * | 8/1981 | Hansen | 74/482 |
| 4,497,503 | A * | 2/1985 | Irwin | 180/335 |
| 4,580,537 | A * | 4/1986 | Uchiyama | 123/352 |
| 4,811,620 | A * | 3/1989 | Old et al. | 74/471 R |
| 5,197,347 | A * | 3/1993 | Moffitt et al. | 74/481 |
| 5,467,663 | A * | 11/1995 | Trowbridge | 74/481 |
| 6,651,524 | B2 * | 11/2003 | Dawson et al. | 74/513 |
| 6,672,414 | B2 * | 1/2004 | Laflamme | 180/53.4 |
| 6,786,312 | B1 * | 9/2004 | Osborne | 192/13 R |
| 6,868,932 | B1 * | 3/2005 | Davis et al. | 180/292 |
| 6,945,376 | B1 * | 9/2005 | Hunter | 192/99 S |
| 7,040,442 | B2 * | 5/2006 | McWhorter | 180/219 |
| 7,318,410 | B2 * | 1/2008 | Yokoi | 123/399 |
| 7,621,380 | B2 * | 11/2009 | Wolfe | 188/2 D |
| 2007/0137408 | A1 * | 6/2007 | Lassiter | 74/551.8 |

* cited by examiner

*Primary Examiner* — Anne Marie Boehler
*Assistant Examiner* — Maurice Williams
(74) *Attorney, Agent, or Firm* — George L. Boller

(57) ABSTRACT

A motorcycle (10) has a foot-operated accelerator pedal (32) for operating the throttle (58) of the engine (12). The pedal (32) and an adjacent brake pedal (34) have shapes correlated to not interfere with each other when they are depressed. The pedals may be provided as original equipment, or retrofitted to an existing motorcycle that has a hand-operated throttle controller.

12 Claims, 3 Drawing Sheets

MOTOR-DRIVEN CYCLE HAVING A FOOT-OPERATED THROTTLE CONTROL

FIELD OF THE INVENTION

This invention relates to motor-driven cycles, particularly to a control for the throttle of the engine.

BACKGROUND OF THE INVENTION

A motorcycle is one type of wheeled cycle that is operated by the coordinated use of hand and foot controls. It is typical to have the clutch lever mounted on the left side of the handlebars for actuation by the operator's left hand, and to have the front brake lever and the hand throttle control mounted on the right side of the handlebars for actuation by the operator's right hand to operate the front wheel brake and the engine throttle respectively. The transmission shift lever, or shift pedal, is typically located at the lower left side of the motorcycle on the transmission where it can be operated by the operator's left foot to shift transmission gears. The rear brake pedal is typically located at the lower right side of the motorcycle where it can be depressed by the operator's right foot to apply the rear wheel brake.

SUMMARY OF THE INVENTION

The inventors have discovered that the incorporation of a foot-operated throttle control in a motorcycle provides a control feature that is useful in certain driving situations. Using a foot-operated throttle can also create a different driving experience for an operator in comparison to using a hand throttle.

Principles of the invention can be applied to the design and manufacture of new motor-driven cycles by an O.E.M. The inventors also believe that marketing opportunities exist for retrofitting existing motorcycles because many motorcycle owners would appreciate the opportunity to retrofit their motorcycles with foot-operated throttle controls and because many motorcycle dealers would like to give customers a sales option of adding foot-operated throttle control to equipping a motorcycle having only a hand-operated throttle control.

Accordingly, principles of the invention relate not just to the incorporation of a foot-operated throttle control in a motorcycle regardless of whether the motorcycle is new or used, but also to a kit and method for retrofitting an existing motorcycle lacking foot-operated throttle control to integrate a foot-operated control with an existing hand-operated throttle control.

One generic aspect of the present invention relates to a motor-driven cycle comprising an engine controlled by a throttle that is operated by a throttle control turning a throttle lever on the exterior of the throttle body, wherein the throttle control comprises a connection operatively connecting a foot-operated accelerator pedal with the throttle lever to cause the throttle lever to turn when an operator's foot depresses the accelerator pedal.

In a preferred embodiment of the invention, the connection comprises a cable.

Another generic aspect relates to a kit for retrofitting a motorcycle with a foot-operated throttle.

The kit includes at least an accelerator pedal and a brake pedal each having a respective pedal arm and a respective foot pad at an end of the respective pedal arm. The opposite end of each arm has a through-hole for enabling the pedals to fit onto a common mounting shaft of a motorcycle. The pedals are arranged such that when installed adjacent each other on the mounting shaft and operatively connected with a wheel brake and the throttle lever respectively, the pedals are free of interference with each other as their respective foot pads are depressed to operate the wheel brake and engine throttle respectively over their respective ranges of travel. When viewed in the direction of the shaft axis, the range of travel of the accelerator pedal does not overlap the range of travel of the brake pedal, the foot pad of the accelerator pedal is always closer to an underlying footboard than is the foot pad of the brake pedal to the footboard, and the foot pad of the accelerator pedal extends further outboard than does the foot pad of the brake pedal.

Still another generic aspect relates to a method of retrofitting a foot-operated accelerator pedal to a motorcycle that has a foot-operated brake pedal arranged on a generally horizontal mounting shaft extending laterally outward from the chassis of the motorcycle to swing about an axis of the shaft for operating a wheel brake when a foot pad on an arm of the brake pedal is depressed.

The method comprises disconnecting the brake pedal from operative connection with the wheel brake and removing it from the mounting shaft, installing on the mounting shaft a brake pedal that has a shape different from that of the removed brake pedal and operatively connecting it with the wheel brake, installing on the mounting shaft adjacent the just-installed brake pedal an accelerator pedal having a shape correlated with that of the adjacent brake pedal, and operatively connecting the installed accelerator pedal with a throttle of an engine that propels the motorcycle.

The correlation of the shape of the accelerator pedal with that of the adjacent brake pedal places the pedals free of interference with each other as they are depressed about the shaft axis over respective ranges of travel to operate the wheel brake and engine throttle respectively. When viewed in the direction of the shaft axis, the range of travel of the accelerator pedal about the shaft axis is closer to an underlying footboard of the motorcycle than is that of the adjacent brake pedal, and an accelerator pedal foot pad via which the accelerator pedal is depressed extends further outboard than does a foot pad of the brake pedal via which the brake pedal is depressed.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
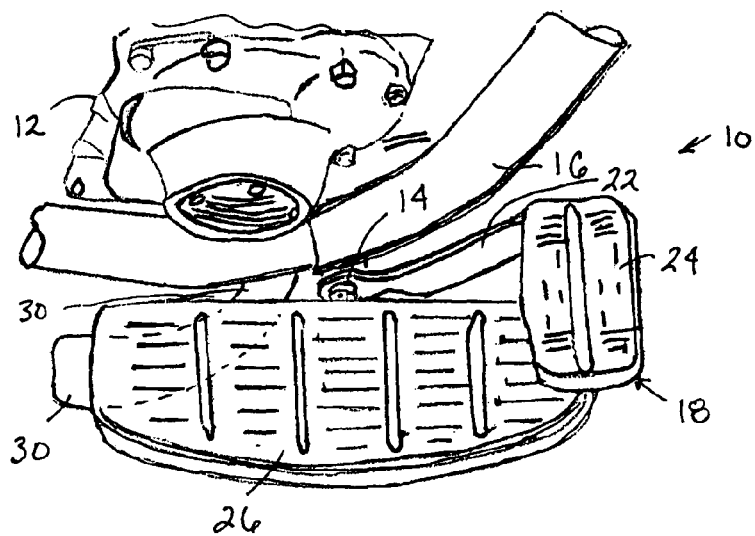
FIG. 1 is a fragmentary perspective view, looking generally downward and inward, at the right side of a known motorcycle in the vicinity of the footboard.

FIG. 1 shows a portion of an existing motorcycle 10 that is relevant to the explanation of how principles of the present invention are applied to retrofit motorcycle 10 with a foot-operated accelerator pedal as will be explained with reference to the later Figures.

Motorcycle 10 comprises a chassis that supports an engine 12 at a location between front and rear wheels (not shown) and generally below the operator's seat (also not shown). A generally horizontal mounting shaft 14 extends laterally outward from the chassis below an exhaust pipe 16 coming from engine 12. A brake pedal 18 is arranged to turn about the axis (reference numeral 48 in later Figures) of shaft 14.

Brake pedal 18 comprises a pedal arm 22 having a proximal end that journals the brake pedal on shaft 14 and an opposite distal end to which is joined a foot pad 24 via which an operator's foot can depress the brake pedal to apply a rear wheel brake for braking the rear wheel. FIG. 1 shows brake pedal 18 in non-applied position.

Figure 5:
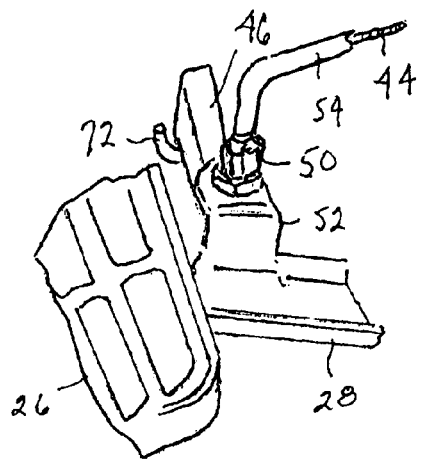
FIG. 5 is another fragmentary perspective view but in the direction of arrow 5 in FIG. 2.

A footboard 26 is supported on the chassis by front and rear brackets 28, 30. Only bracket 30 is shown in FIG. 1; bracket 28 is shown in FIG. 5. The footboard is laterally outward of pedal arm 22 in relation to where the pedal arm is journaled on shaft 14. Pedal arm 22 has an intermediate bend that places a more distal portion of the arm further outboard of the chassis.

Footboard 26 provides a rest for the right foot of the motorcycle operator. When the operator applies the rear wheel brake, his/her foot is moved to push on foot pad 24, depressing brake pedal 18 in the process.

Engine 12 also has a throttle that is not seen in FIG. 1. The throttle has a throttle lever that is operated by a throttle control (also not seen in FIG. 1). The throttle control comprises one or more cables connecting a hand-operated throttle controller on the handlebars with the throttle lever to cause the throttle lever to turn in a correlation with operation of the controller.

Figure 2:
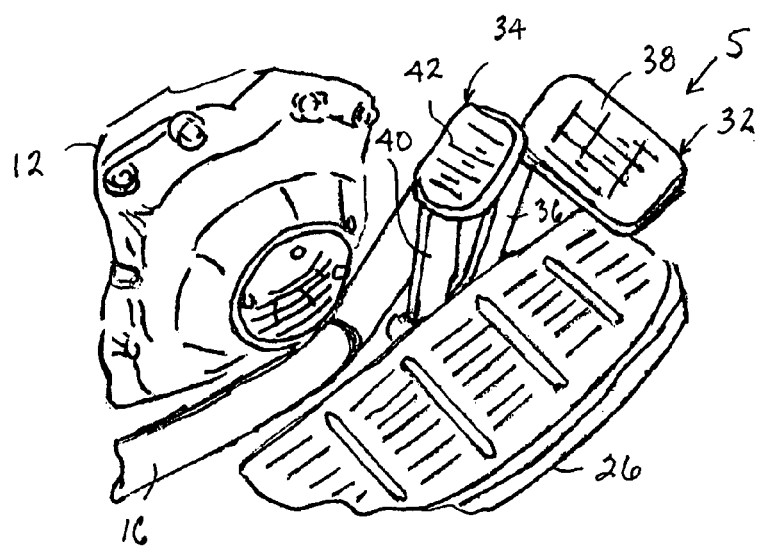
FIG. 2 is a fragmentary perspective view, from a slightly different direction, of the right side of the motorcycle after it has been retrofitted with a foot-operated throttle control in accordance with principles of the present invention.

FIG. 2 shows a presently preferred embodiment of the invention that incorporates a foot-operated accelerator pedal 32 in motorcycle 10. Pedal 32 has a shape correlated with that of a foot-operated brake pedal 34 that operates the rear wheel brake of the motorcycle in the same way as brake pedal 18. Both pedals 32, 34 are arranged immediately adjacent each other on shaft 14, with pedal 32 outboard of pedal 34.

Accelerator pedal 32 comprises a pedal arm 36 having a proximal end that journals the accelerator pedal on shaft 14 and an opposite distal end to which is joined a foot pad 38 via which the operator can depress the accelerator pedal.

Brake pedal 34 comprises a pedal arm 40 having a proximal end that journals the brake pedal on shaft 14 and an opposite distal end to which is joined a foot pad 42 via which the operator can depress the brake pedal.

An operative connection from accelerator pedal 32 to the engine throttle comprises a cable 44 one end of which is fixed to pedal 32. Pedal 32 comprises a cam 46 arranged on pedal arm 36 radially of the axis 48 of shaft 14 to turn with the accelerator pedal. The one end of cable 44 attached to pedal arm 36 is tethered at a location that, as accelerator pedal 32 is depressed, pulls cable 44, causing the cable to wrap onto a cam track, or groove, in cam 46, pulling the cable in the process. Beyond cam 46 relative to axis 48, cable 44 is guided by a cable guide 50 that is fastened via a bracket 52 to footboard mounting bracket 28. Beyond cable guide 50, cable 44 runs through a sheath 54 that is routed to the throttle.

Figure 6:
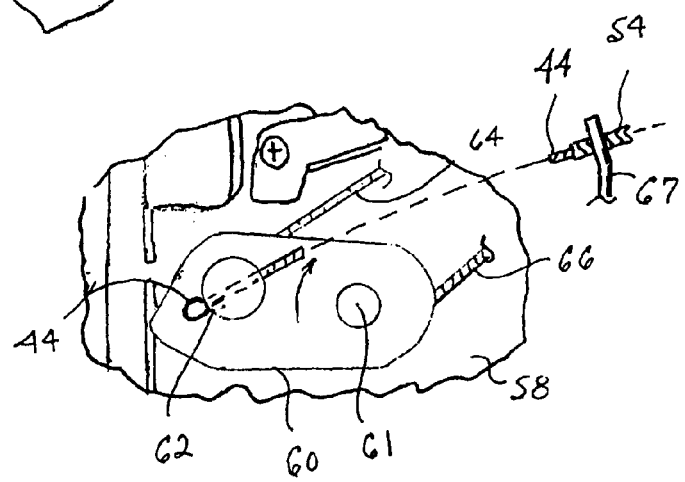
FIG. 6 is a schematic diagram of a throttle and associated throttle lever showing various cable connections to the lever.

FIG. 6 shows that upon exiting the sheath near the throttle 58, cable 44 attaches to a throttle lever 60 on the exterior of the body of throttle 58. In particular, cable 44 attaches to the throttle lever at a post 62 to which an actuator (not shown) from a cruise control unit (not shown) can also attach. FIG. 6 also shows cables 64, 66 from the hand throttle connecting to lever 60.

A bracket 67 is mounted on the motorcycle to locate sheath 54 so that cable 44 approaches lever 60 from generally the same direction as does cable 64.

While lever 60 has been referred to here as the throttle lever, the actual construction may comprise two separate lever parts that are joined together and fixed to the throttle shaft. In such a construction, cable 44 attaches to one lever part, as shown, and cables 64, 66 attach to the other lever part, which is not specifically shown in FIG. 6, but is behind the part shown.

FIG. 6 shows lever 60 in idle position. When either cable 64 or cable 44 pulls on the lever, the lever turns about the throttle shaft axis 61 in the clockwise direction. With the engine running at idle, such motion will accelerate the engine. Coils of a torsional return spring (not shown in FIG. 6) are disposed around the shaft on the exterior of the throttle body. The tails of the spring engage the throttle body and the throttle lever respectively to bias the throttle shaft toward idle position.

Cable 44 passes through a hole in post 62, and the far end of the cable has a stop, such as a ball, that interferes with the post so that when the operator depresses accelerator pedal 32 to pull on the cable, the cable will not be pulled through the hole, but rather will turn lever 60. This manner of connecting cable 44 with the throttle lever provides a lost motion connection that allows the cable to slide through the hole in post 62 when lever 60 is being turned by the hand throttle so that the presence of the accelerator pedal and its connection to the throttle lever don't interfere with operation of the hand throttle.

Figure 3:
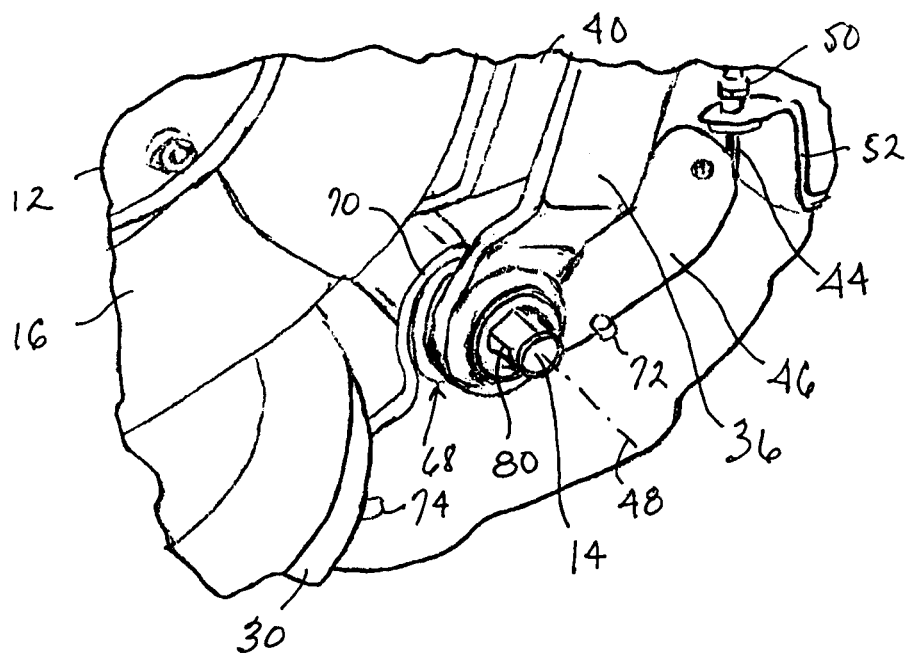
FIG. 3 is a fragmentary perspective view, similar to FIG. 2, but from a different direction.
Figure 4:
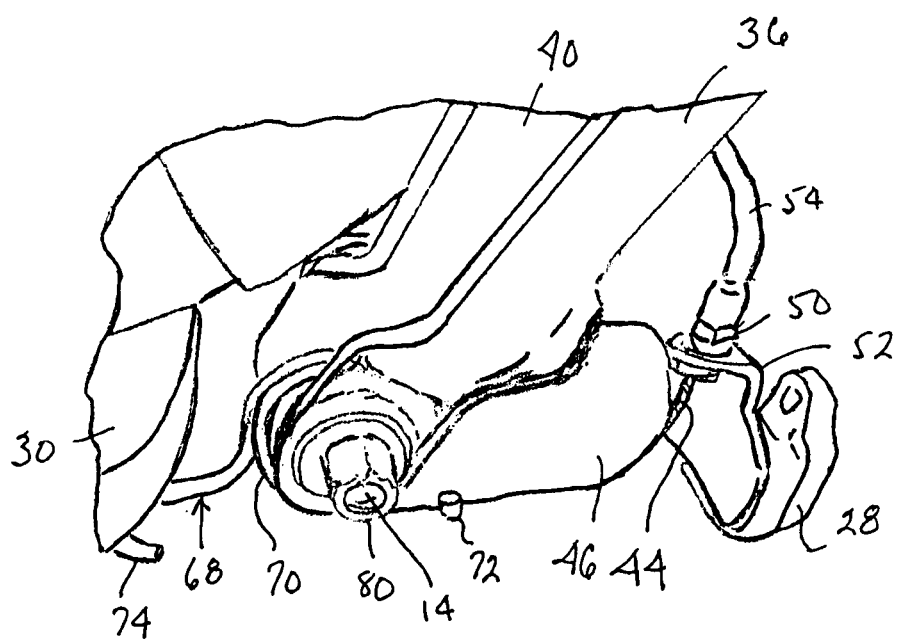
FIG. 4 is a fragmentary perspective view, similar to FIG. 3, but from a slightly different direction.

FIGS. 2, 3, and 4 show both accelerator pedal 32 and brake pedal 34 in non-depressed positions. The non-depressed position of accelerator pedal 32 corresponds to idle position of throttle 58. A torsion spring 68 that comprises coils 70 disposed about shaft 14 urges pedal 32 to that position by having one tail 72 of the spring hooked under the pedal as shown and the other tail 74 hooked under bracket 30.

The hand controller has a similar biasing, and when neither it nor accelerator pedal 32 is being actuated, throttle lever 60 assumes idle position to place the throttle in idle. Because the hand controller and the accelerator pedal can be actuated independently of each other, actuation of either one will turn lever 60 in a corresponding amount. When the hand controller is actuated to open the throttle, lever 60 turns in a way that doesn't pull on the cable from a cruise control unit connected to post 62. By connecting cable 44 to post 62, pedal 32 is not depressed by actuation of the hand controller.

However, when the cruise control is active, it will move the hand controller. Consequently, when accelerator pedal 32 is depressed, it too will move the hand controller.

Figure 7:
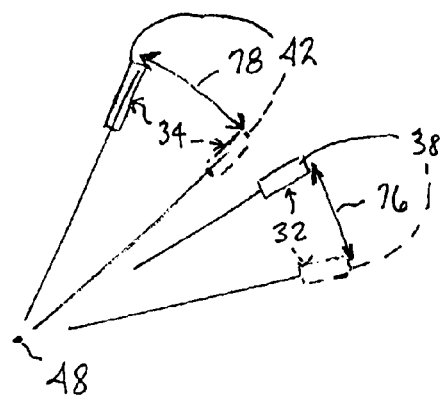
FIG. 7 is a schematic diagram illustrating certain principles of the invention.

Pedals 32, 34 are arranged to be free of interference with each other as their respective foot pads 38, 42 are depressed. FIG. 7 shows that the range of travel 76 of accelerator pedal 32 about axis 48 does not overlap the range of travel 78 of the brake pedal. Foot pad 38 of the accelerator pedal is always closer to footboard 26 than is foot pad 42 of brake pedal 34 to the footboard. FIG. 2 shows that foot pad 38 extends further outboard of the motorcycle than does foot pad 42.

FIGS. 2-7 show what may be either an O.E.M. installation or a retrofit using a kit. Such a kit comprises at least pedals 32,

34. The kit preferably also includes spring 68, cable 44 and its sheath, cable guide 50, and bracket 52.

The retrofit of the existing motorcycle 10 shown in FIG. 1 is performed by removing footboard 26 from its mounting brackets to provide more convenient access to a nut 80 that is holding pedal 18 on shaft 14, and then unscrewing the nut. Pedal 18 is disconnected from the connection to the rear wheel brake and removed. The two replacement pedals 32, 34 are placed on shaft 14, pedal 34 first. Spring 68 is put in place at the same time. Nut 80 is then screwed back onto the shaft, and pedal 34 is connected to the connection to the rear wheel brake. Bracket 52 is attached to bracket 28, and the sheathed cable is routed to the throttle where cable 44 is connected to post 62 on lever 60. Finally the footboard is re-installed.

From the foregoing, the reader can understand that the invention has various advantageous aspects. While a presently preferred embodiment has been illustrated and described, it is to be appreciated that the inventive principles are applicable to other embodiments within the scope of the following claims that define the inventive subject matter.

What is claimed is:

1. A motor-driven cycle comprising an engine controlled by a throttle that is operated away from idle position by a throttle control to accelerate the engine, the throttle comprising a throttle body, a throttle shaft which is biased toward idle position about a throttle shaft axis, and a throttle lever on the exterior of the throttle body for turning the throttle shaft about the throttle shaft axis against the bias on the throttle shaft to accelerate the engine, wherein the throttle control comprises a foot pedal cable which connects a foot-operated accelerator pedal to the throttle lever and which, when an operator's foot depresses the accelerator pedal to accelerate the engine, pulls the foot pedal cable to cause the throttle shaft to turn away from idle position, and a hand throttle cable which connects a hand-operated throttle controller to the throttle lever and which, when an operator's hand operates the hand-operated throttle controller to accelerate the engine, pulls the hand throttle cable to cause the throttle shaft to turn away from idle position, and in which the accelerator pedal and the hand-operated throttle controller interact such that operation of the hand-operated throttle controller to accelerate the engine imparts no corresponding motion to the accelerator pedal but operation of the accelerator pedal to accelerate the engine imparts corresponding motion to the hand-operated throttle controller.

2. A motor-driven cycle as set forth in claim 1 wherein the accelerator pedal is arranged on a generally horizontal mounting shaft extending laterally outward from a chassis of the motor-driven cycle to swing about an axis of the mounting shaft.

3. A motor-driven cycle as set forth in claim 2 wherein the accelerator pedal comprises a pedal arm having one end that journals the accelerator pedal on the mounting shaft and an opposite end having a foot pad via which an operator depresses the accelerator pedal.

4. A motor-driven cycle as set forth in claim 3 further including a torsion spring having coils disposed about the mounting shaft and terminating in tails, one of which hooked onto a stationary part of the motor-driven cycle and the other of which is hooked onto the accelerator pedal to cause the spring to exert torque that urges the accelerator pedal, and hence the throttle lever, toward throttle idle position.

5. A motor-driven cycle comprising an engine controlled by a throttle that is operated by a throttle control turning a throttle lever, wherein the throttle control comprises a connection operatively connecting a foot-operated accelerator pedal with the throttle lever to cause the throttle lever to turn when an operator's foot depresses the accelerator pedal, wherein the accelerator pedal is arranged on a generally horizontal mounting shaft extending laterally outward from a chassis of the motor-driven cycle to swing about an axis of the mounting shaft, the accelerator pedal comprises a pedal arm having one end that journals the accelerator pedal on the mounting shaft and an opposite end having a foot pad via which an operator depresses the accelerator pedal, further including a torsion spring having coils disposed about the mounting shaft and terminating in tails, one of which is hooked onto a stationary part of the motor-driven cycle and the other of which is hooked onto the accelerator pedal to cause the spring to exert torque that urges the accelerator pedal, and hence the throttle lever, toward throttle idle position, and wherein the operative connection comprises a cable from the accelerator pedal to the throttle lever, and the accelerator pedal comprises a cam arranged on the pedal arm radially of the mounting shaft axis to swing with the accelerator pedal, one end of the cable is tethered to the accelerator pedal at a location that, as the accelerator pedal is depressed to pull the cable, causes the cable to wrap onto the cam, and wherein beyond the cam relative to the mounting shaft axis, the cable is guided by a cable guide that is fastened to a footboard mounting bracket that extends laterally from the chassis and supports a footboard that underlies the foot pad of the accelerator pedal.

6. A motor-driven cycle as set forth in claim 5 wherein an opposite end of the cable has an operative connection to the throttle lever at a post on the lever.

7. A motor-driven cycle as set forth in claim 6 further including a hand throttle for turning the throttle lever to accelerate the engine, and wherein the operative connection of the cable to the throttle lever provides lost motion between the cable and the post when the hand throttle is operated to accelerate the engine.

8. A motor-driven cycle as set forth in claim 6 further including a foot-operated brake pedal for operating a wheel brake of the motor-driven cycle, wherein the brake pedal is arranged on the mounting shaft immediately adjacent the accelerator pedal.

9. A motor-driven cycle as set forth in claim 8 wherein the brake pedal comprises a pedal arm having one end that journals the brake pedal on the mounting shaft and an opposite end having a foot pad via which an operator's foot can depress the brake pedal to apply the wheel brake, and wherein the pedals are arranged to be free of interference with each other as their respective foot pads are depressed.

10. A motor-driven cycle as set forth in claim 9 wherein the pedals are arranged such that when viewed in the direction of the shaft axis, the range of travel of the accelerator pedal does not overlap the range of travel of the brake pedal, the foot pad of the accelerator pedal is always closer to the footboard than is the foot pad of the brake pedal to the footboard, and the foot pad of the accelerator pedal extends further outboard of the motor-driven cycle than does the foot pad of the brake pedal.

11. A motor-driven cycle comprising an engine controlled by a throttle that is operated by a throttle control turning a throttle lever, wherein the throttle control comprises a connection operatively connecting a foot-operated accelerator pedal with the throttle lever to cause the throttle lever to turn when an operator's foot depresses the accelerator pedal, wherein the accelerator pedal is arranged on a generally horizontal mounting shaft extending laterally outward from a chassis of the motor-driven cycle to swing about an axis of the mounting shaft, further including a footboard underlying an accelerator pedal foot pad that an operator's foot depresses to operate the throttle, and a foot-operated brake pedal arranged on the mounting shaft immediately adjacent the accelerator pedal for operating a wheel brake of the motor-driven cycle, the brake pedal comprising a brake pedal foot pad that the operator's foot depresses to apply the wheel brake, wherein the pedals are arranged to be free of interference with each other as their respective foot pads are depressed, and wherein the pedals are arranged such that when viewed in the direction of the mounting shaft axis, the range of travel of the accelerator pedal does not overlap the range of travel of the brake pedal, the foot pad of the accelerator pedal is always closer to the footboard than is the foot pad of the brake pedal to the footboard, and the foot pad of the accelerator pedal extends further outboard of the motor-driven cycle than does the foot pad of the brake pedal.

12. A motor-driven cycle comprising an engine controlled by a throttle that is operated away from idle position by a throttle control to accelerate the engine, the throttle comprising a throttle body, a throttle shaft which is biased toward idle position about a throttle shaft axis, and a throttle lever on the exterior of the throttle body for turning the throttle shaft about the throttle shaft axis against the bias on the throttle shaft to accelerate the engine, wherein the throttle control comprises a foot pedal cable which connects a foot-operated accelerator pedal to the throttle lever and which, when an operator's foot depresses the accelerator pedal to accelerate the engine, pulls the foot pedal cable to cause the throttle shaft to turn away from idle position, and a hand throttle cable which connects a hand-operated throttle controller to the throttle lever and which, when an operator's hand operates the hand-operated throttle controller to accelerate the engine, pulls the hand throttle cable to cause the throttle shaft to turn away from idle position, and further comprising a spring that acts on a part of the accelerator pedal to bias the accelerator pedal toward idle position, in which the hand-operated throttle controller is also biased toward idle position, and in which the accelerator pedal and the hand-operated throttle controller interact such that operation of the hand-operated throttle controller to accelerate the engine imparts no corresponding motion to the accelerator pedal but operation of the accelerator pedal to accelerate the engine imparts corresponding motion to the hand-operated throttle controller.

\* \* \* \* \*